US012676567B2

(12) United States Patent　　　　　(10) Patent No.:　US 12,676,567 B2

Ge et al.　　　　　　　　　　　　　　(45) Date of Patent:　　Jul. 7, 2026

(54) EXTERNALLY EXCITED SYNCHRONOUS MACHINE-BASED ELECTRIC DRIVE INTEGRATING GALVANICALLY ISOLATED AC

(71) Applicant: FORD GLOBAL TECHNOLOGIES, LLC, Dearborn, MI (US)

(72) Inventors: Baoming Ge, Okemos, MI (US); Fan Xu, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 135 days.

(21) Appl. No.: 18/816,330

(22) Filed: Aug. 27, 2024

(65) Prior Publication Data

US 2026/0066827 A1　　Mar. 5, 2026

(51) Int. Cl.
| | |
|---|---|
| *B60L 53/20* | (2019.01) |
| *B60L 15/00* | (2006.01) |
| *B60L 50/51* | (2019.01) |
| *B60L 50/60* | (2019.01) |
| *B60L 53/22* | (2019.01) |
| *B60R 16/033* | (2006.01) |
| *H02P 25/022* | (2016.01) |
| *H02P 27/08* | (2006.01) |

(52) U.S. Cl.
CPC ............ *H02P 27/08* (2013.01); *B60L 15/007* (2013.01); *B60L 50/51* (2019.02); *B60L 50/60* (2019.02); *H02P 25/022* (2013.01); *B60L 2210/40* (2013.01); *B60L 2220/14* (2013.01)

(58) Field of Classification Search
CPC .. B60L 50/51; B60L 2210/40; B60L 2220/14; B60L 15/007; B60L 53/14; B60L 53/22; H02P 25/022; H02P 6/32; H02M 1/10; H02M 1/007

USPC .................................................... 307/9.1–10.2
See application file for complete search history.

(56) References Cited

U.S. PATENT DOCUMENTS

| | | |
|---|---|---|
| 8,963,482 B2 | 2/2015 | Ang et al. |
| 11,217,996 B2 | 1/2022 | Lehn et al. |
| 11,482,948 B2 | 10/2022 | Lehn et al. |

(Continued)

FOREIGN PATENT DOCUMENTS

| | | | | |
|---|---|---|---|---|
| DE | 102024205527 B3 * | 10/2025 | ............... | H02P 6/32 |
| EP | 3238979 B1 | 12/2023 | | |
| KR | 20210050555 A | 5/2021 | | |

OTHER PUBLICATIONS

English Translation and Oringial Foreign Document of DE102024205527_B3 (Year: 2025).*

*Primary Examiner* — Rexford N Barnie
*Assistant Examiner* — Terrence R Willoughby
(74) *Attorney, Agent, or Firm* — David B. Kelley; Brooks Kushman P.C.

(57)　　　　　　　ABSTRACT

An automotive power system integrates a power factor correction circuit, an H-bridge power module, an externally excited synchronous machine, a traction inverter, and a traction battery. The system operates in two modes: driving and charging. In driving mode, power flows from the traction battery through the H-bridge power module and the traction inverter to the externally excited synchronous machine, enabling vehicle propulsion. In charging mode, power from an AC source is routed sequentially through the power factor correction circuit, the H-bridge power module, the synchronous machine, and the traction inverter.

17 Claims, 8 Drawing Sheets

(56)　　　　　References Cited

U.S. PATENT DOCUMENTS

| | | | |
|---|---|---|---|
| 2017/0282747 A1 | 10/2017 | Wang | |
| 2023/0378797 A1* | 11/2023 | Hao | H02M 5/12 |
| 2025/0010739 A1* | 1/2025 | Saha | H02J 7/02 |
| 2025/0010740 A1* | 1/2025 | Saha | H02P 27/06 |

* cited by examiner

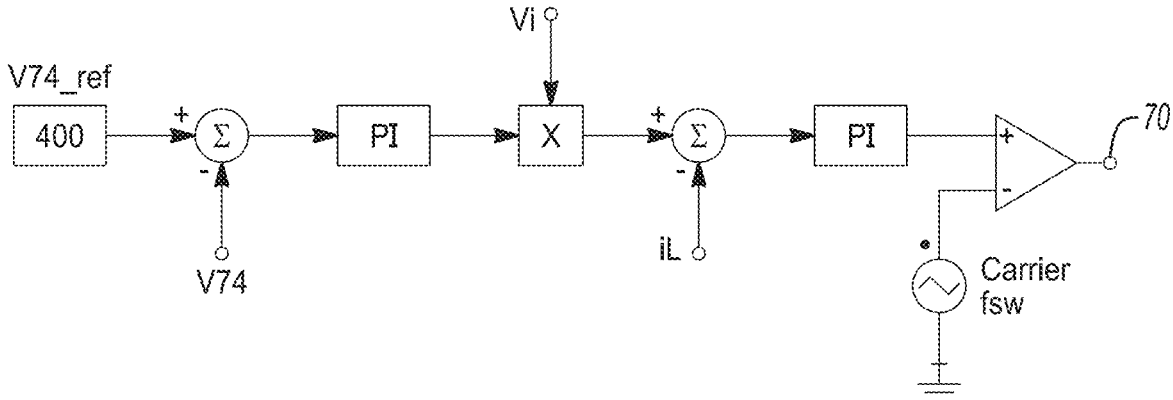
_Fig-3_
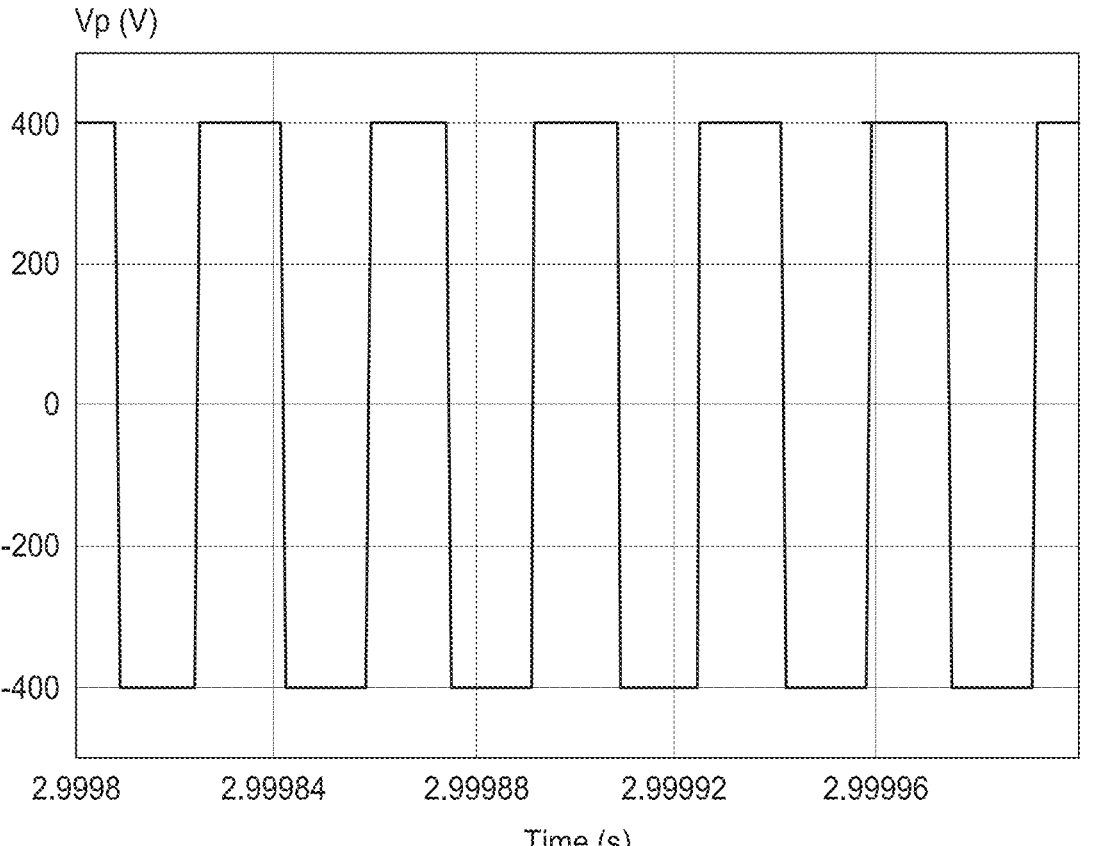
_Fig-4_

EXTERNALLY EXCITED SYNCHRONOUS MACHINE-BASED ELECTRIC DRIVE INTEGRATING GALVANICALLY ISOLATED AC

TECHNICAL FIELD

This disclosure relates to automotive power systems.

BACKGROUND

Electric and hybrid vehicles rely on a combination of components that provide propulsion and manage energy. These components include the traction battery, which stores electrical energy; the electric motor, which converts this electrical energy into mechanical energy to propel the vehicle; and the inverter, which converts the direct current (DC) power from the battery into alternating current (AC) power suitable for the motor. Additionally, a power electronics system, comprising converters, controllers, and other subsystems, manages the flow of energy between the battery, motor, and other components.

SUMMARY

A vehicle includes a power system with several components: a power factor correction circuit, an H-bridge power module, an externally excited synchronous machine, a traction inverter, and a traction battery. In driving mode, the H-bridge power module and the traction inverter connect the traction battery to the externally excited synchronous machine, allowing the vehicle to be propelled. In charging mode, these components are reconfigured so that the H-bridge power module and the synchronous machine connect between the power factor correction circuit and the traction inverter, enabling the traction battery to be charged.

A method involves changing the connections within a system based on a vehicle's operational mode. In driving mode, power flows from a traction battery through ab H-bridge power module and a traction inverter to an externally excited synchronous machine, which drives the vehicle. In charging mode, power from an AC source passes through a power factor correction circuit, the H-bridge power module, the synchronous machine, and the traction inverter before reaching the traction battery, thereby charging it.

An automotive power system is made up of a power factor correction circuit, an H-bridge power module, an externally excited synchronous machine, a traction inverter, and a traction battery. During driving mode, power from the traction battery travels through the H-bridge power module and the traction inverter to the externally excited synchronous machine, which drives the vehicle. During charging mode, power from an AC source moves through the power factor correction circuit, the H-bridge power module, the synchronous machine, and the traction inverter before finally reaching the traction battery, allowing it to recharge.

BRIEF DESCRIPTION OF THE DRAWINGS

FIG. 3 is a block diagram for power factor control during AC-charging mode operation.

FIG. 4 is a plot of H-bridge power module output voltage.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
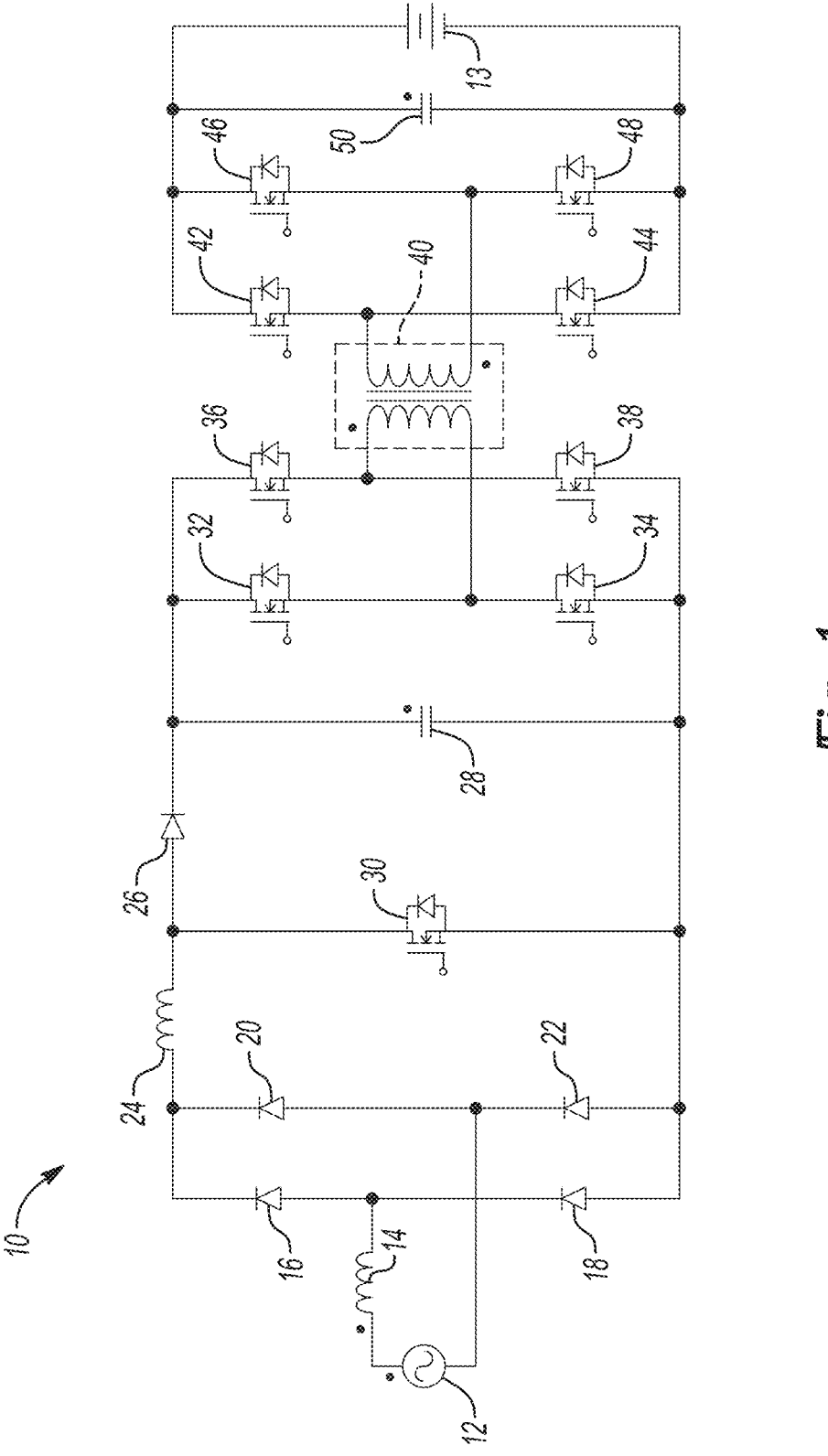
FIG. 1 is a schematic diagram of a typical AC on-board charger.

FIG. 1 illustrates an existing AC on-board charger 10 for electric vehicles and hybrid electric vehicles, designed to convert AC power from a grid 12 into DC power suitable for charging a traction battery 13. The system begins with input from the AC grid 12 that provides the necessary power, typically at a frequency of 50 Hz or 60 Hz. An inductor 14 is connected in series with the AC grid 12 to filter the input, reducing high-frequency noise and harmonics. Diodes 16, 18 are part of a full-bridge rectifier that, along with diodes 20, 22, converts the AC input into a pulsating DC voltage. Following the rectifier bridge, inductor 24 further filters the DC current, smoothing it to reduce ripple and provide a more stable output. Diode 26, connected in series with the inductor 24, facilitates unidirectional current flow towards capacitor 28 and subsequent circuit stages.

The capacitor 28 is connected in parallel with the output of the diode 26. Switch 30 is a control switch connected across the inductor 24, used to manage power flow by disconnecting or connecting the inductor 24 from the negative busbar. Switches 32, 34, 36, 38 form a full-bridge inverter that converts the smoothed DC voltage back into high-frequency AC voltage, necessary for energy transfer and for the operation of high-frequency transformer 40. This transformer 40 provides galvanic isolation between the input and output circuits and steps up or steps down the voltage as needed.

On the secondary side of the high-frequency transformer 40, switches 42, 44, 46, 48 form another full-bridge rectifier that converts the high-frequency AC voltage back into DC voltage suitable for charging the traction battery 13. Capacitor 50, connected across the output of this rectifier, smooths the DC voltage. The traction battery 13, connected to the output of the charger, stores the converted DC power for use by the vehicle's electric drivetrain.

Such AC on-board chargers require space and have associated weight. A proposed AC on-board charger is based on an externally excited synchronous machine (EESM) and achieves galvanic isolation by integrating the AC charger into the electric-drive system.

An EESM is a type of electric machine in which the magnetic field required for operation is generated by an external DC supply, rather than by permanent magnets or the rotor itself. This machine is usually composed of two main parts: the stator and the rotor. The stator houses a set of three-phase windings through which an AC flows, creating a rotating magnetic field. The rotor, which is located inside the stator, contains a field winding that is excited by an external DC source. This external excitation can be provided through slip rings and brushes, which deliver the DC current to the rotor winding.

The rotor often features laminated iron cores to minimize eddy current losses. The rotor winding can be made of copper or aluminum and is wound in such a way that it produces a magnetic field when DC current is applied. The magnetic field generated by the rotor interacts with the rotating magnetic field produced by the stator, causing the rotor to lock in and rotate synchronously with the stator field. This synchronous operation means that the rotor speed is directly proportional to the frequency of the AC supply and does not vary with load changes.

In operation, the EESM can function as either a motor or a generator. As a motor, it converts electrical energy into mechanical energy by maintaining a constant speed under varying loads. When operating as a generator, it converts mechanical energy into electrical energy by maintaining a constant frequency of output power.

An aspect of EESMs is their ability to control the power factor by adjusting the field excitation. By varying the amount of DC current supplied to the rotor, the machine can be operated at leading, lagging, or unity power factor, depending on the requirements of the load.

Figure 2A:
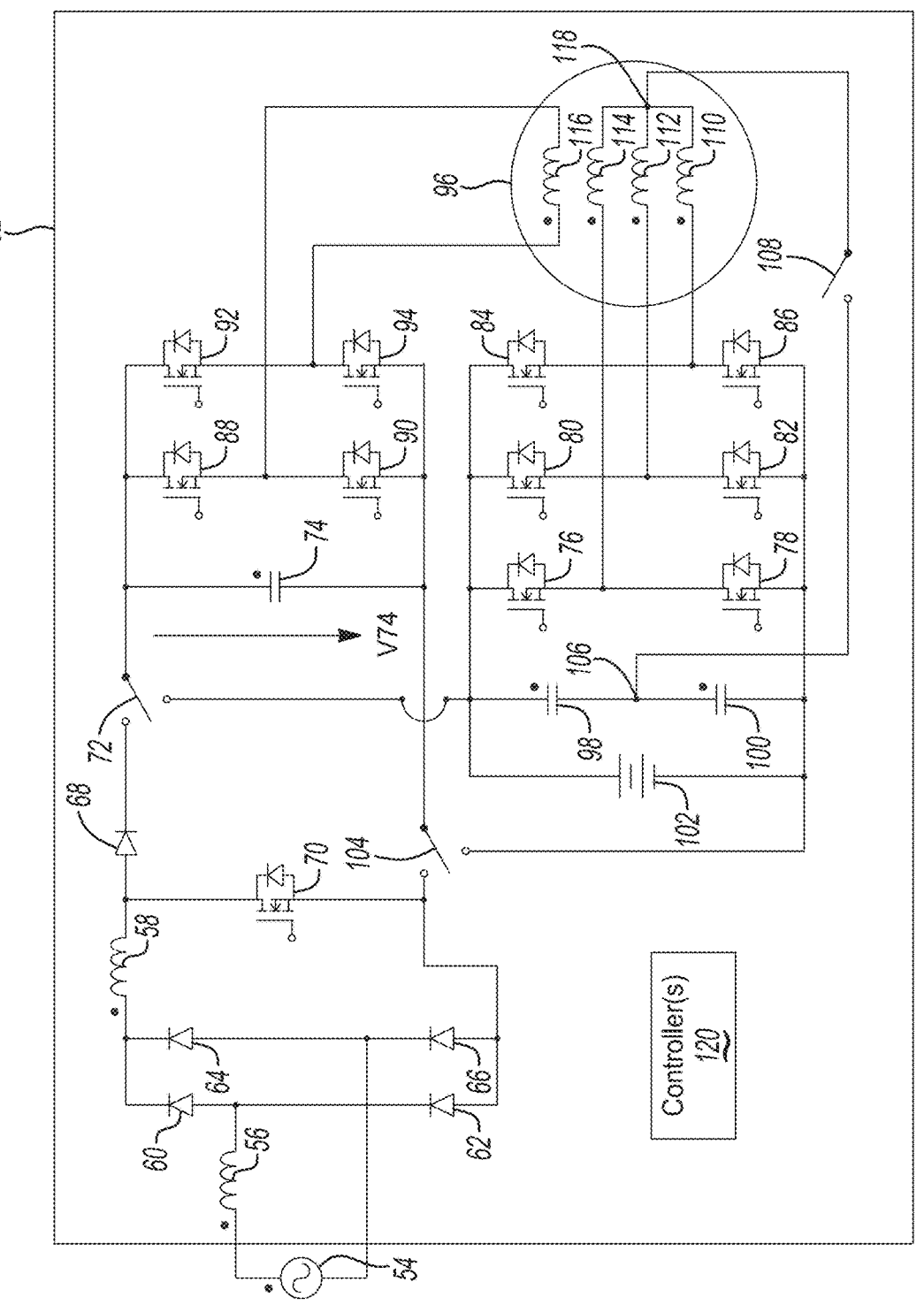
FIGS. 2A-2C are schematic diagrams of an externally excited synchronous machine-based electric drive that integrates a galvanically isolated AC on-board charger.

Referring to FIG. 2A, the circuitry of vehicle 52 interfaces with an AC grid 54. The AC input 54 is filtered through a combination of inductors 56, 58. These inductors 56, 58 help in smoothing the AC waveform and reducing high-frequency noise. The AC signal is then rectified using a bridge rectifier formed by diodes 60, 62, 64, 66. This rectification process converts the AC input into a pulsating DC output.

After rectification, the pulsating DC is further smoothed by the inductor 58 and diode 68, forming a boost converter stage that manages the voltage level. The switch 70, controlled by an external circuit, modulates the current through inductor 58, allowing the output voltage to be boosted to the desired level.

The smoothed and controlled DC voltage is then directed to relay 72. The relay 72 controls the connection between the DC source and the next stage of the circuitry. When the relay 72 is in position 1, the DC voltage is connected to capacitor 74, which acts as a filter capacitor, smoothing out any remaining ripples in the DC voltage.

The circuit then connects to an array of switches 76, 78, 80, 82, 84, 86, 88, 90, 92, 94, which form an inverter stage. This inverter stage is responsible for converting the DC voltage back into AC, which can be used to EESM 96.

Capacitors 98, 100 are connected across traction battery 102, serving as energy storage elements to stabilize the voltage and provide a steady supply of power to the inverter stage. The traction battery 102 acts as the main power source for this circuitry, supplying energy for the inverter and subsequently the EESM 96.

Relay 104, when in position 1, connects the traction battery 102 to the inverter stage, enabling the system to function. Neutral point 106 is connected between a shared node of the series connected capacitors 98, 100 and the relay 108, which provides a means to disconnect the EESM 96 from the rest of the circuitry.

The inverter stage outputs three-phase AC power to the EESM 96, which includes stator windings 110, 112, 114 and rotor winding 116. The stator windings 110, 112, 114 are each connected to neutral point 118. The rotor winding 116 is connected to the H-bridge power module.

Controller 120 is in communication with/exerts control over the components of the vehicle 52 and implements the techniques described herein. It may use automotive communication protocols such as CAN (Controller Area Network), LIN (Local Interconnect Network), and/or FlexRay to establish communication channels. These protocols enable the controller 120 to send and receive data packets containing operational commands and status information. For instance, the controller 120 can send PWM signals to the inverter to modulate the power supplied to the EESM 96, adjusting its speed and torque. It also monitors sensors distributed throughout the vehicle 52 to collect data on parameters such as battery voltage, current, temperature, and motor position. This data can be processed in real-time using embedded algorithms to adjust the motor drive and battery management systems. Additionally, the controller 120 can manage the operation of other auxiliary systems, such as the heating, ventilation, and air conditioning system, regenerative braking system, etc.

This system thus employs a three-phase EESM, a power factor correction (PFC) circuit, a traction inverter, an H-bridge power module, and three contactors to implement both electric-drive and AC on-board charging functionalities. The three-phase inverter, which includes the switches 76-86 and the capacitors 98, 100, transfers power between the EESM stator windings 110, 112, 114 and the traction battery 102 during both vehicle driving mode and AC on-board charging mode. The series capacitors 98, 100 have the neutral point 106 between them. The neutral point 118 of the stator windings 110, 112, 114 is connected to the neutral point 106 through the contactor 108. The rotor winding 116 is connected to the H-bridge power module, which includes the switches 88-94 and capacitor 74. The three-way contactors 72, 104 establish connections between the PFC circuit, which includes the inductor 56, 58, diodes 60-68, and switch 70, the H-bridge power module, and the three-phase inverter. The EESM 96 serves two functions: acting as a normal motor during vehicle driving and as an isolation transformer during AC on-board charging.

Figure 2B:
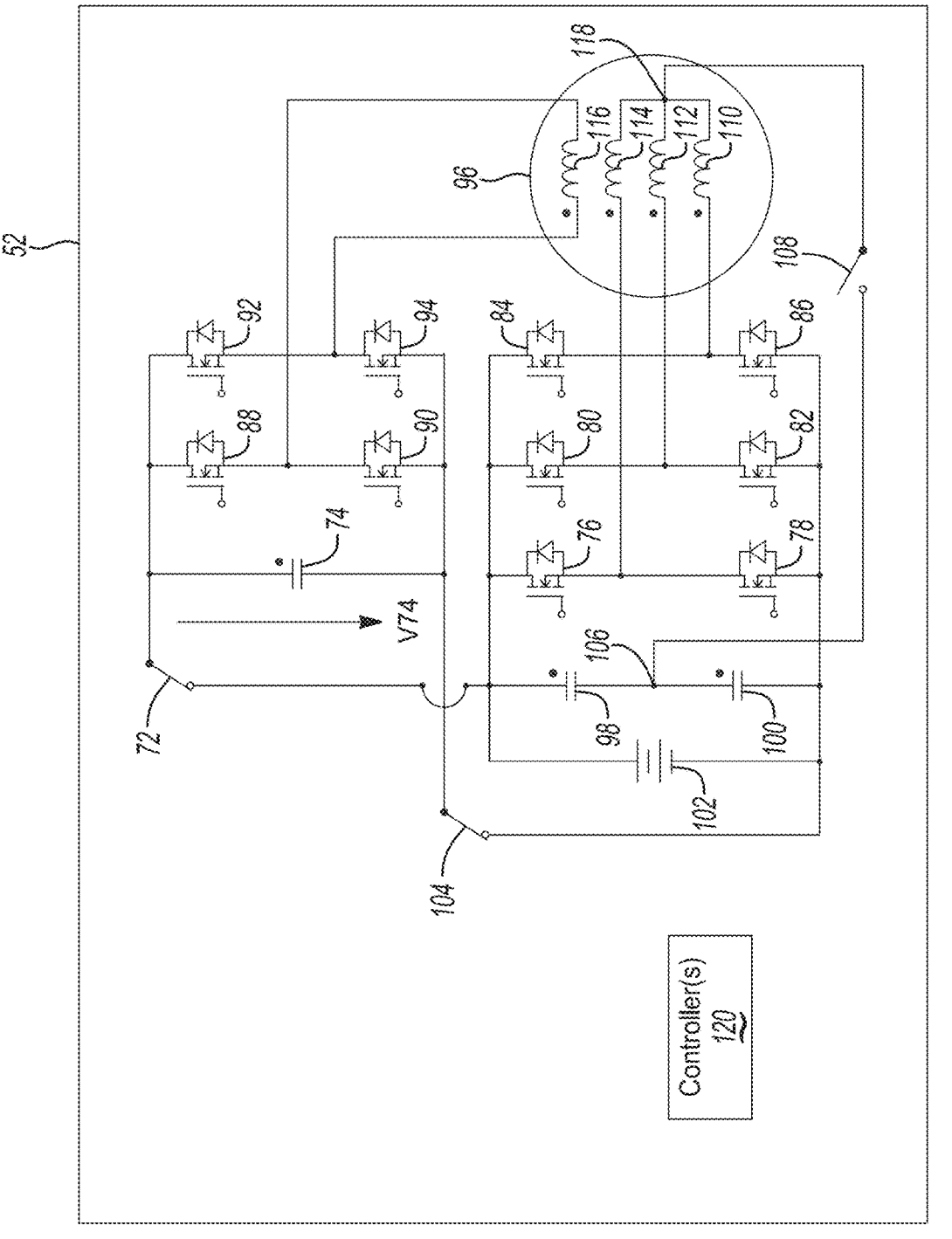

Referring to FIG. 2B and during driving of the vehicle 52, the contactors 72, 104 are in position 2 to connect the H-bridge power module and the traction battery 102, and the PFC circuit is disconnected from the H-bridge power module. The contactor 108 is open. The traction battery 102 provides power to drive the EESM 96 and vehicle 52 through the traction inverter. The rotor magnetic field is controlled by the H-bridge power module.

Figure 2C:
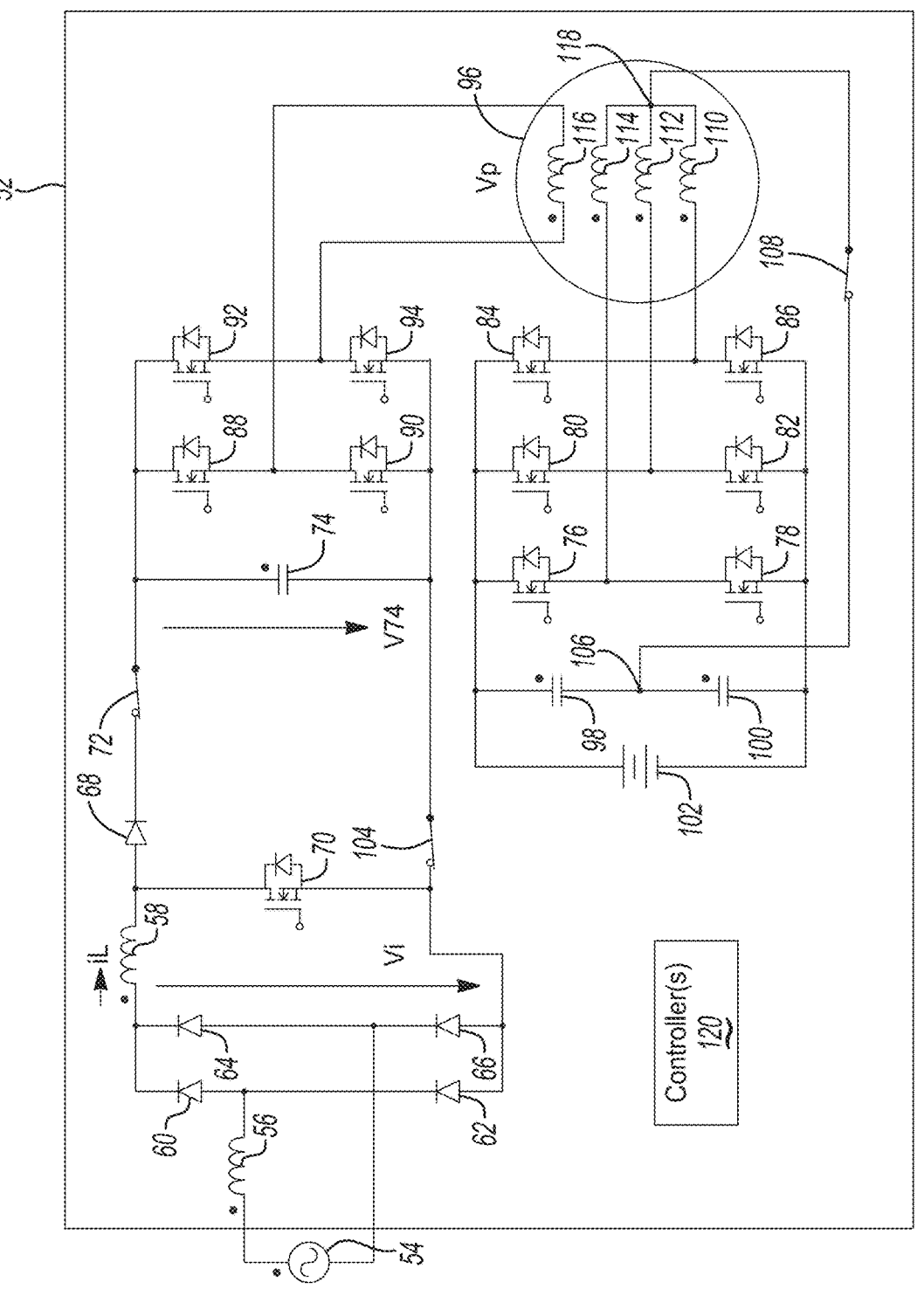

Referring to FIG. 2C and during the AC on-board charging mode, the contactors 72, 104 are in position 1 to connect the H-bridge power module and the PFC circuit, and the H-bridge power module is disconnected from the traction battery 102. The contactor 108 is closed. Power from the AC grid 54 power goes through the PFC circuit, the H-bridge power module, the rotor winding 116, the air gap of the EESM 96, the windings 110, 112, 114, and the three-phase inverter to charge the traction battery 102. In this operating mode, the EESM 96 works as a transformer to achieve galvanic isolation.

Referring to FIG. 3, the control strategy for the AC on-board charging mode includes the PFC control, H-bridge power module control, and three-phase inverter control. The control block diagram represents a feedback control system designed to control the voltage $V_{74}$ at a specified reference level, using a proportional-integral (PI) controller and pulse width modulation (PWM). The system maintains the voltage $V_{74}$ at a desired reference value, $V_{74-ref}$, which is set in this example at 400 volts. The actual voltage $V_{74}$ is measured and compared to this reference value to generate an error signal. This error, representing the difference between the desired and actual voltage, is processed by the first PI controller. The PI controller adjusts its output based on both the magnitude of the current error and the accumulation of past errors, producing a control signal that directs the correction needed to bring $V_{74}$ closer to the reference value.

The output from this first PI controller is then multiplied by an input voltage Vi. This multiplication step may represent modulation, or a gain adjustment based on Vi, and the resulting signal is fed into the next stage of the control system. Simultaneously, the current iL, representing the inductor current, is measured and compared to the signal produced by the previous stage. The difference between these signals is calculated to generate a current error, which is then processed by a second PI controller. This PI controller's role is to ensure that the inductor current iL follows the desired trajectory as dictated by the output from the first PI controller.

The final stage of the control process involves comparing the output of the second PI controller with a high-frequency carrier signal with frequency fsw. This comparison takes place within a comparator, producing a PWM signal 70. This PWM signal is used to control the switch 70. The switching frequency is typically set to match the operational frequency of the converter. The output signal 70 is the ultimate control signal that drives the power electronics switches.

Referring to FIG. 4, the H-bridge power module generates a high-frequency voltage in square waveform of x % duty cycle by controlling the switches 88-94. The figure shows an example of a voltage waveform with 50% duty cycle and 30 kHz.

The three-phase inverter can work in a diode rectifier mode by turning off the switches 76-86. To the extent the switches 76-86 are silicon carbide metal-oxide-semiconductor field-effect transistors, they can be controlled to utilize their reverse conduction to achieve the rectifier function. The waveform shown in FIG. 4 can be used to generate control signals for the switches 76-86. The AC charging power can be controlled by $V_{74}$ and the duty cycle of the voltage waveform.

Figure 5A:
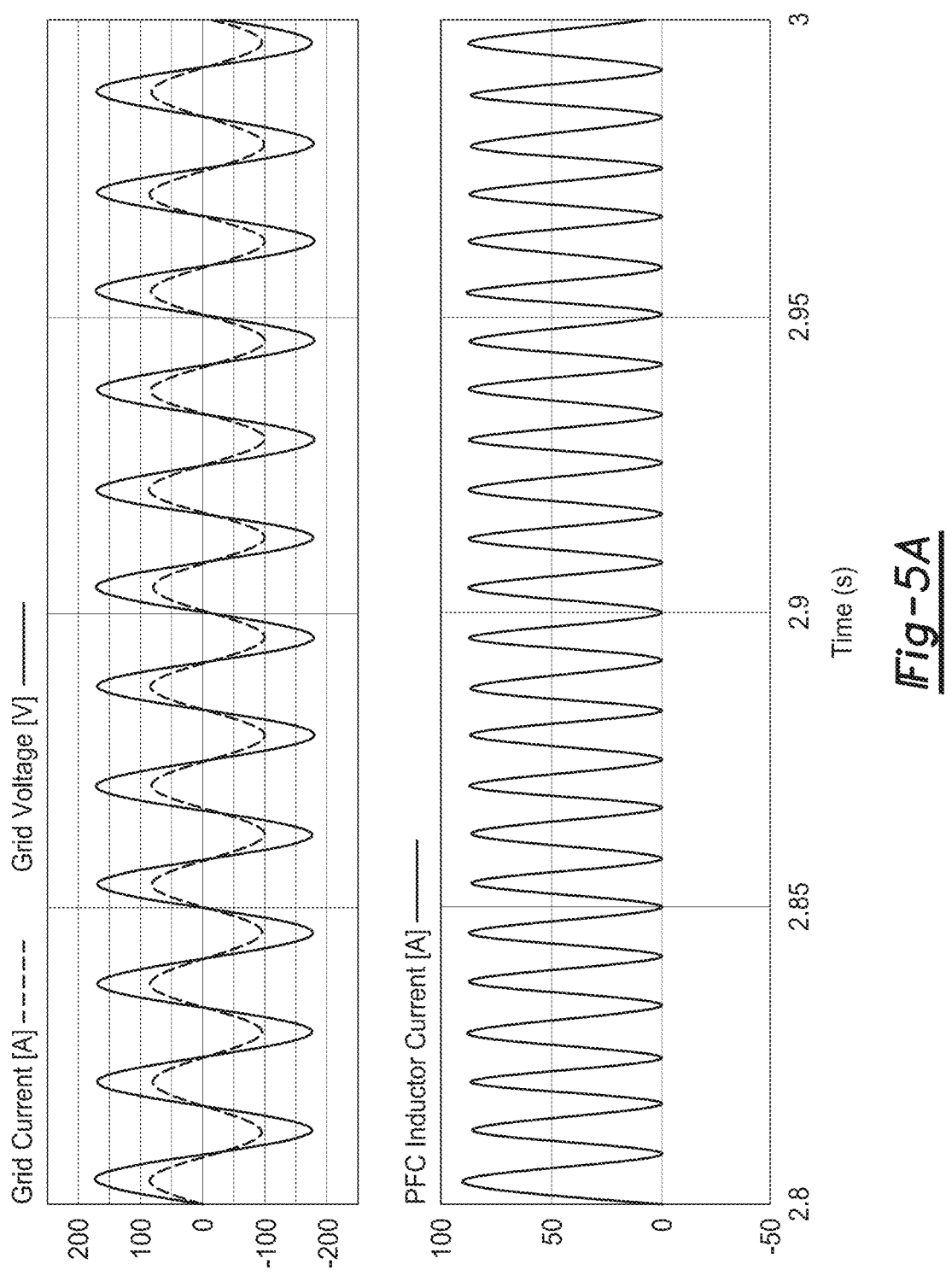
FIG. 5A are plots of grid voltage and current, and power factor control inductor current.
Figure 5B:
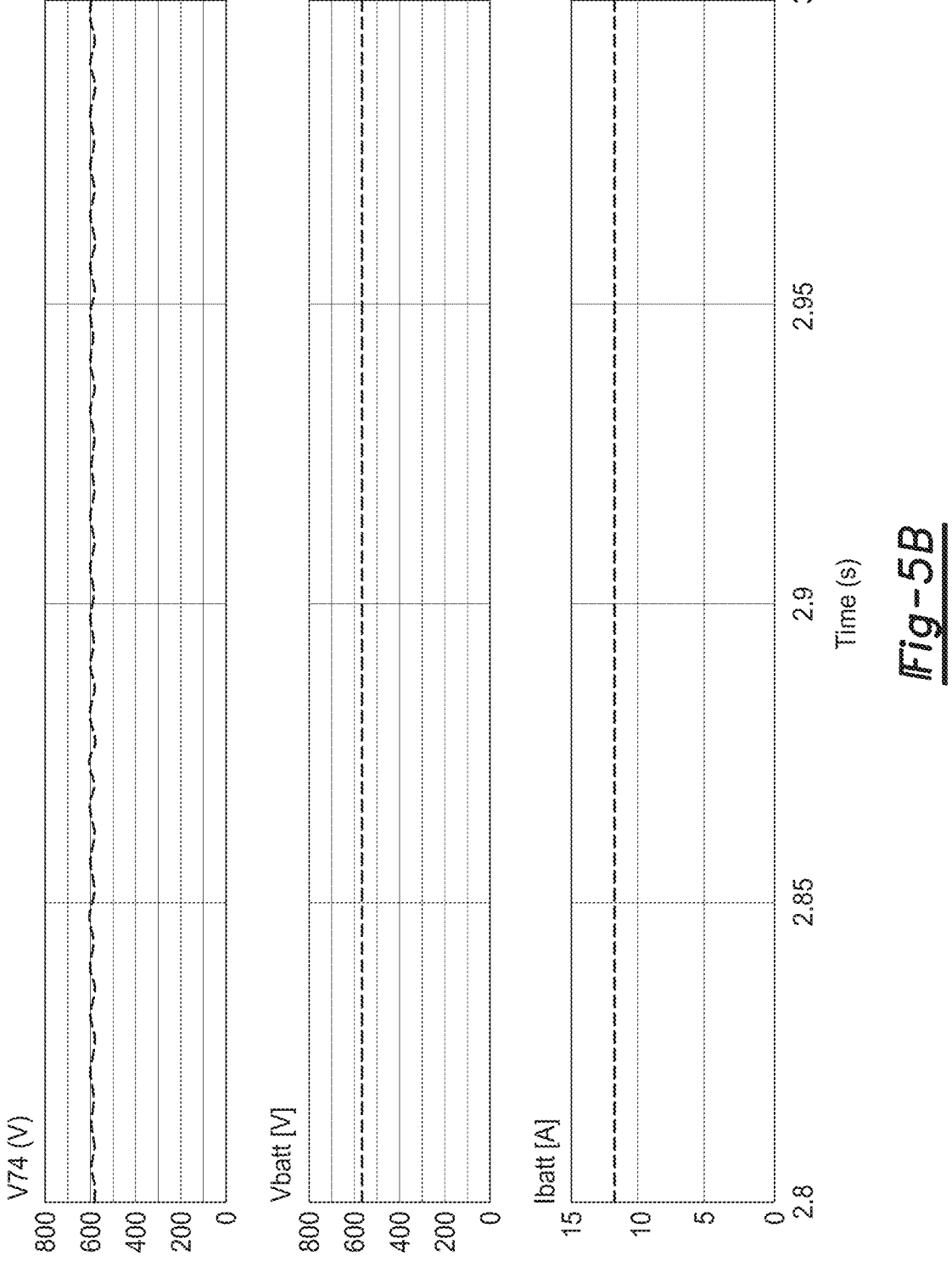
FIG. 5B are plots of H-bridge DC bus voltage, and battery voltage and current.
Figure 5C:
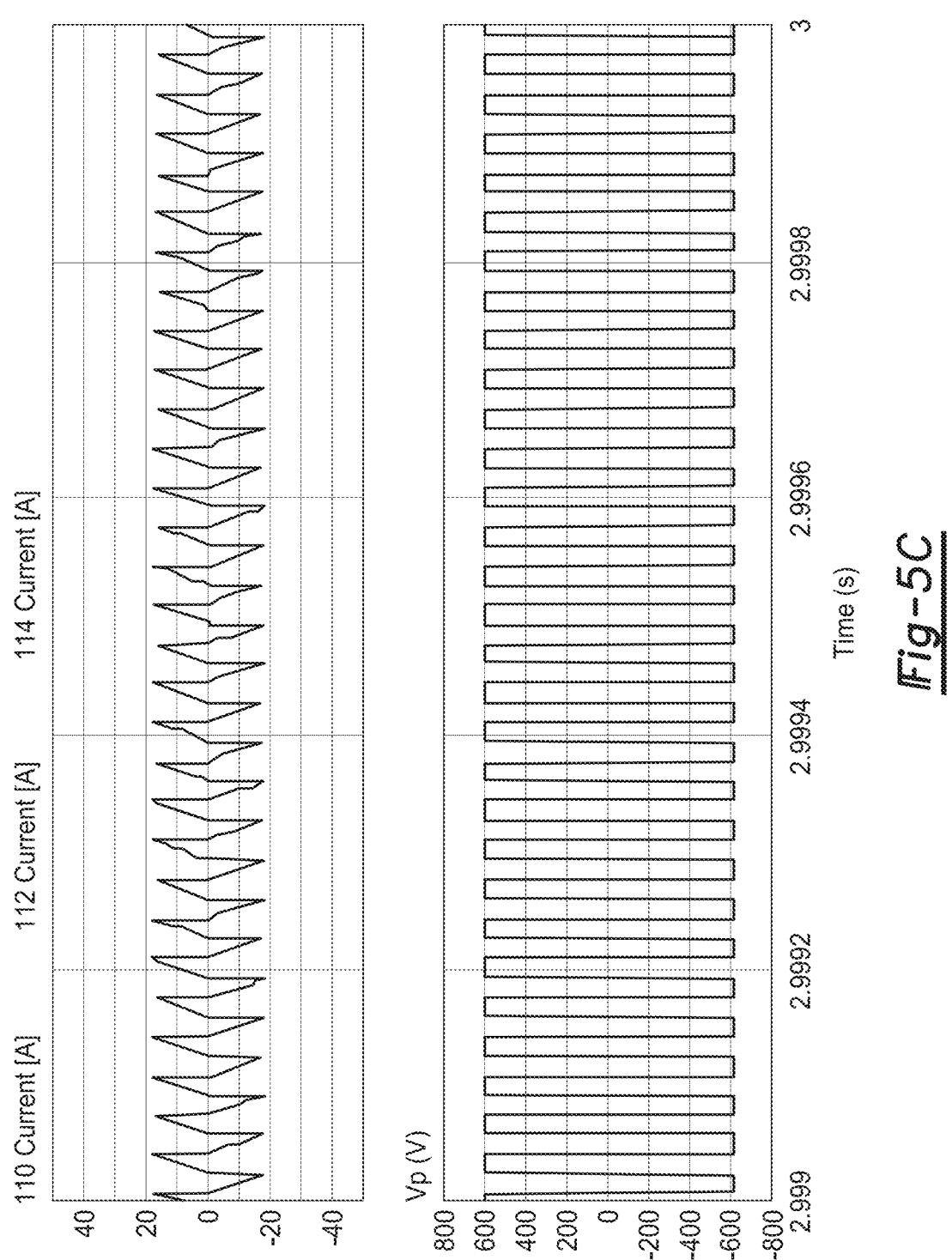
FIG. 5C are plots of stator winding currents and H-bridge output voltage.

FIGS. 5A-5C show the simulation results when charging a traction battery through the proposed AC on-board charger. In simulation, the AC power grid has 120V rms and 60 Hz, and $V_{74}$=600V. The traction battery charging current is 12 A (6.9 kW) and the grid current is 60 A rms. Also, the power factor is 1.0 and the grid current total harmonic distortion is 3.3%. The EESM transfers power from the power grid to the traction battery, and at the same time achieves the galvanic isolation between the traction battery and power grid.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. Moreover, the words used in the specification are words of description rather than limitation, and it is understood that various changes may be made without departing from the spirit and scope of these disclosed materials. "Controller" and "Controllers," for example, can be used interchangeably herein as the functionality of one can be distributed across several, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a power system, including a power factor correction circuit, an H-bridge power module, an externally excited synchronous machine, a traction inverter, and a traction battery, configured such that during a drive mode, the H-bridge power module and traction inverter are each connected between the traction battery and externally excited synchronous machine, and during a charge mode, the H-bridge power module and externally excited synchronous machine are connected between the power factor correction circuit and traction inverter.

2. The vehicle of claim 1, wherein the power system is further configured such that, during the drive mode, power from the traction battery flows through each of the H-bridge power module and traction inverter to the externally excited synchronous machine.

3. The vehicle of claim 1, wherein the power system is further configured such that, during the charge mode, power from an AC source flows sequentially through the power factor correction circuit, H-bridge power module, externally excited synchronous machine, traction inverter, and to the traction battery.

4. The vehicle of claim 1, wherein the traction inverter includes phase legs and wherein the externally excited synchronous machine includes stator windings connected to the phase legs.

5. The vehicle of claim 4, wherein the stator windings are connected to a neutral point.

6. The vehicle of claim 5, wherein the traction inverter includes a pair of series connected capacitors and wherein the power system is further configured such that, during the charge mode, the neutral point is connected between the capacitors.

7. The vehicle of claim 4, wherein the externally excited synchronous machine includes a rotor winding connected with the H-bridge power module and air-gapped from the stator windings.

8. The vehicle of claim 1, wherein the power system further includes a pair of three-way switches having different connection states during the drive mode and charge mode.

9. A method comprising:

changing connection states of contactors such that, during a drive mode, power from a traction battery flows through each of an H-bridge power module and a traction inverter to an externally excited synchronous machine that drives a vehicle, and during a charge mode, power from an AC source flows sequentially through a power factor correction circuit, the H-bridge power module, the externally excited synchronous machine, the traction inverter, and to the traction battery.

10. The method of claim 9 further comprising changing connection states of the contactors such that, during the charge mode, a neutral point of the externally excited synchronous machine is connected between a pair of capacitors of the traction inverter.

11. An automotive power system comprising:

a power factor correction circuit, an H-bridge power module, an externally excited synchronous machine, a traction inverter, and a traction battery collectively configured such that, during a drive mode, power from the traction battery flows through each of the H-bridge power module and traction inverter to the externally excited synchronous machine, and during a charge mode, power from an AC source flows sequentially through the power factor correction circuit, H-bridge power module, externally excited synchronous machine, traction inverter, and to the traction battery.

12. The automotive power system of claim 11, wherein the power factor correction circuit, H-bridge power module, externally excited synchronous machine, traction inverter, and traction battery are further collectively configured such that that during the drive mode, the H-bridge power module and traction inverter are each connected between the traction battery and externally excited synchronous machine.

13. The automotive power system of claim 11, wherein the power factor correction circuit, H-bridge power module, externally excited synchronous machine, traction inverter, and traction battery are further collectively configured such that during the charge mode, the H-bridge power module and externally excited synchronous machine are connected between the power factor correction circuit and traction inverter.

14. The automotive power system of claim 11, wherein the traction inverter includes phase legs and wherein the externally excited synchronous machine includes stator windings connected to the phase legs.

15. The automotive power system of claim 14, wherein the stator windings are connected to a neutral point.

16. The automotive power system of claim 15, wherein the traction inverter includes a pair of series connected capacitors and wherein the power factor correction circuit, H-bridge power module, externally excited synchronous machine, traction inverter, and traction battery are further collectively configured such that, during the charge mode, the neutral point is connected between the capacitors.

17. The automotive power system of claim 14, wherein the externally excited synchronous machine includes a rotor winding connected with the H-bridge power module and air-gapped from the stator windings.

* * * * *